United States Patent
Zhang et al.

(10) Patent No.: US 11,470,294 B2
(45) Date of Patent: Oct. 11, 2022

(54) METHOD, DEVICE, AND STORAGE MEDIUM FOR CONVERTING IMAGE FROM RAW FORMAT TO RGB FORMAT

(71) Applicant: BEIJING DAJIA INTERNET INFORMATION TECHNOLOGY CO., LTD., Beijing (CN)

(72) Inventors: Wenbo Zhang, Beijing (CN); Hongmin Xu, Beijing (CN); Wen Zheng, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 60 days.

(21) Appl. No.: 17/084,946

(22) Filed: Oct. 30, 2020

(65) Prior Publication Data

US 2021/0058595 A1    Feb. 25, 2021

Related U.S. Application Data (63) Continuation of application No. PCT/CN2019/111077, filed on Oct. 14, 2019.

(30) Foreign Application Priority Data

Dec. 4, 2018 (CN) .......................... 201811473815.6

(51) Int. Cl.
*H04N 5/228* (2006.01)
*H04N 9/67* (2006.01)
(Continued)

(52) U.S. Cl.
CPC .............. *H04N 9/67* (2013.01); *G06K 9/6257* (2013.01); *H04N 5/232939* (2018.08)

(58) Field of Classification Search
CPC ... G06K 9/6257; H04N 5/232939; H04N 9/67
(Continued)

(56) References Cited

U.S. PATENT DOCUMENTS

2011/0199520 A1   8/2011   Katou
2015/0296193 A1   10/2015  Cote
(Continued)

FOREIGN PATENT DOCUMENTS

CN     1632829 A      6/2005
CN   101902650 A     12/2010
(Continued)

OTHER PUBLICATIONS

First OA for CN application 201811473815.6.
(Continued)

*Primary Examiner* — Usman A Khan
(74) *Attorney, Agent, or Firm* — Timothy W. Menasco, Esq.; Harter Secrest & Emery LLP (57) ABSTRACT

The disclosure can provide a method for converting an image, an apparatus for converting an image, an electronic device, and a storage medium. The method includes: obtaining an image in RAW format; obtaining a semantic analysis result of the image in RAW format by inputting the image in RAW format into a pre-trained first network model; the first network model being obtained by training based on a labeled training sample corresponding to each of a plurality of first training samples, the first training sample being a sample image in RAW format, and the labeled training sample being a sample image in RAW format obtained by labeling a semantic analysis result on the corresponding first training sample; and determining an image in RGB (Red-Green-Blue) format corresponding to the image in RAW format based on the semantic analysis result of the image in RAW format.

24 Claims, 3 Drawing Sheets

(51) Int. Cl.
*H04N 5/232* (2006.01)
*G06K 9/62* (2022.01)

(58) Field of Classification Search
USPC .................................................... 348/222.1
See application file for complete search history.

(56) References Cited

U.S. PATENT DOCUMENTS

2016/0358338 A1* 12/2016 Tsunoda ............... G06K 9/6267
2018/0322660 A1* 11/2018 Smith ..................... G06T 7/97

FOREIGN PATENT DOCUMENTS

| | | |
|---|---|---|
| CN | 102419744 A | 4/2012 |
| CN | 103731154 A | 4/2014 |
| CN | 104427349 A | 3/2015 |
| CN | 104732506 A | 6/2015 |
| CN | 107016415 A | 8/2017 |
| CN | 107833194 A | 3/2018 |

OTHER PUBLICATIONS

English translation of first OA for CN application 201811473815.6.
Second OA for CN application 201811473815.6.
English translation of second OA for CN application 201811473815.6.
Notice of Allowance for CN application 201811473815.6.
English translation of Notice of Allowance for CN application 201811473815.6.

* cited by examiner

METHOD, DEVICE, AND STORAGE MEDIUM FOR CONVERTING IMAGE FROM RAW FORMAT TO RGB FORMAT

CROSS-REFERENCE TO RELATED APPLICATION

This application is a continuation of International Application No. PCT/CN2019/111077 filed on Oct. 14, 2019, which claims priority to Chinese Patent Application No. 201811473815.6 filed on Dec. 4, 2018, the disclosure of which is hereby incorporated herein by reference.

FIELD

The disclosure relates to the field of image processing technologies, and more particularly, to a method for converting an image, an apparatus for converting an image, an electronic device, and a storage medium.

BACKGROUND

Original images in RAW format may be collected by CMOS (Complementary Metal Oxide Semiconductor) cameras, CCD (Charge Coupled Device) cameras, or the like. The images in RAW format generally have a bitwidth of 12 bits, that is, each pixel in the images in RAW format may be represented by 12 bits. The images in RAW format captured by high-end cameras may reach a bitwidth of 16 bits or even 24 bits. However, a bitwidth processed by computers may generally be 8 bits, such that it is necessary to convert images from RAW format to RGB (Red-Green-Blue) format with a smaller bitwidth during processing the images through the computers. Then, the images in RGB format may be processed through the computers.

SUMMARY

According to embodiments of the disclosure, a method for converting an image is provided. The method includes: obtaining an image in RAW format; obtaining a semantic analysis result of the image in RAW format by inputting the image in RAW format into a pre-trained first network model; the first network model being obtained by training based on a labeled training sample corresponding to each of a plurality of first training samples, the first training sample being a sample image in RAW format, and the labeled training sample being a sample image in RAW format obtained by labeling a semantic analysis result on the corresponding first training sample; and determining an image in RGB (Red-Green-Blue) format corresponding to the image in RAW format based on the semantic analysis result of the image in RAW format.

According to embodiments of the disclosure, an electronic device is provided. The electronic device includes a processor and a memory configured to store an instruction executable by the processor. The processor is configured to execute the instruction to carry out the above method.

According to embodiments of the disclosure, a non-transitory computer-readable storage medium is provided. When an instruction in the storage medium is executed by a processor of an electronic device, the electronic device may implement the above method.

The above general description and the following detailed description are only exemplary and explanatory, and cannot limit the disclosure.

BRIEF DESCRIPTION OF THE DRAWINGS

In order to clearly illustrate technical solutions of embodiments of the disclosure and of the related art, a brief description of drawings used in embodiments and in the related art is given below. Obviously, the drawings in the following description are only part embodiments of the disclosure, and for those skilled in the art, other drawings may be obtained according to these drawings without creative labor.

DETAILED DESCRIPTION

In order to make the objectives, technical solutions, and advantages of the disclosure clearer, the disclosure will be described in detail below with reference to the accompanying drawings and embodiments. Obviously, embodiments described here are only part of embodiments of the disclosure and are not all embodiments of the disclosure. Based on embodiments of the disclosure, other embodiments obtained by those skilled in the art without creative labor are within the scope of the disclosure.

In the related art, reference pixel values may be determined based on preset image signal processing (ISP) parameters in a method of converting an image in RAW format to an image in RGB format. The reference pixel values are pixel values of pixels to be discarded. Pixels with reference pixel values may be discarded from an image in RAW format. Therefore, pixel values of the remaining pixels may be represented by a lower bitwidth, so that an image in RGB format with a low bitwidth may be generated. However, for different presentation content in the image in RAW format, the discarded pixels with reference pixel values have different effects on display effects of the different presentation content. Therefore, the method employed for converting the image in RAW format into the image in RGB format in the related art may make a poor image quality of the image in RGB format, which is converted from the image in RAW format. Therefore, the disclosure provides the solutions for converting an image in RAW format to an image in RGB format.

It should be noted that an execution subject of a method for converting an image according to embodiments of the disclosure may be an apparatus for converting an image. The apparatus may be applicable to an electronic device. In applications, the electronic device may be a mobile phone, a video camera, a camera, a computer, a digital broadcasting terminal, a messaging device, a game console, a tablet device, a medical device, a fitness device, an entertainment device, a personal digital assistant, or the like.

Figure 1:
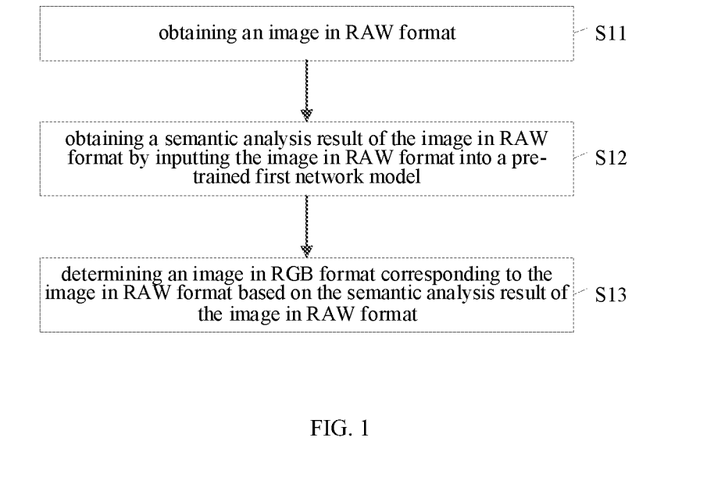
FIG. 1 is a flowchart illustrating a method for converting an image according to some embodiments.

FIG. 1 is a flowchart illustrating a method for converting an image according to some embodiments. As illustrated in FIG. 1, the method may include actions in the following blocks.

At block S11, an image in RAW format is obtained. The image in RAW format is an image to be converted.

The image in RAW format is original image data of digital signals converted from light source signals captured by a CMOS image sensor or a CCD image sensor. Pixels in this image are arranged in Bayer form, and this image is a lossless digital image. The bitwidth of the image in RAW format is generally 12 bits. To put it simply, each pixel is represented by 12 bits, or each pixel contains 12-bit information. Of course, the bitwidth may also exceed 12 bits, such as 16 bits or more.

At block S12, a semantic analysis result of the image in RAW format is obtained by inputting the image in RAW format into a pre-trained first network model.

The first network model is obtained by training based on a labeled training sample corresponding to each of a plurality of first training samples. The first training sample is a sample image in RAW format. The labeled training sample is a sample image in RAW format obtained by labeling a semantic analysis result on the corresponding first training sample.

Both the semantic analysis result of the image in RAW format and the semantic analysis result labeled in the labeled training sample may be understood as an image segmentation result segmented based on a semantic understanding of the content of the image in RAW format. In detail, the semantic analysis result may include attribute information of each pixel in the image in RAW format. The attribute information of the pixel may include category information of a segmentation area where the pixel is located. It may be understood that the content presented in the segmentation area in the image in RAW format may be determined based on the category information of the segmentation area where the pixel is located. In practical applications, the semantic analysis result may be data expressed in mathematical forms such as vectors or matrices, so as to facilitate the training and application of the first network model.

It may be understood that since the labeled training sample is labeled with the semantic analysis results of the corresponding first training sample, the first network model, obtained by training based on the plurality of labeled training samples, may learn a way of determining the semantic analysis result of the image in RAW format. In this manner, by inputting the image in RAW format into the pre-trained first network model, the semantic analysis result of the image in RAW format may be obtained. To present a clear solution and a clear layout, the process of training the first network model will be described in detail in the following embodiments, and thus will not be described here.

At block S13, an image in RGB format corresponding to the image in RAW format is determined based on the semantic analysis result of the image in RAW format.

It may be understood that since the semantic analysis result of the image in RAW format contains attribute information of respective pixels in the image in RAW format, the content presented by the image in RAW format may be determined based on the attribute information. For different content, image processing may be performed with image signal processing (ISP) parameters applicable to the content, instead of using preset unified ISP parameters for processing as in the related art. Reference pixel values of pixels to be discarded may vary with the ISP parameters. Consequently, when the image in RAW format is converted to the image in RGB format, the discarded pixels have little impact on the image quality of the image where the content of the discarded pixels is located, so that the image in RGB format with a satisfying image quality may be obtained by conversion.

For example, it is supposed that the image in RAW format contains two parts of content: the sea and the beach, the bitwidth thereof is 12 bits (i.e., a pixel value of each pixel in the image in RAW format may have a total of 4096 levels ranging from 0 to 4095), and the bitwidth of the image in RGB format after conversion is 8 bits. For the content of the sea, a set of cold tone ISP parameters is applicable. Assuming that pixel values to be discarded corresponding to this set of ISP parameters are 256 to 4095, pixels with pixel values in a range of 256 to 4095 are deleted from pixels belonging to the content of the sea in the image in RAW format, and pixels with pixel values in a range of 0 to 255 are retained. For the content of the beach, a set of warm tone ISP parameters is applicable. Assuming that pixel values to be discarded corresponding to this set of ISP parameters are 0 to 127 and 384 to 4095, pixels with pixel values in ranges of 0 to 127 and 384 to 4095 are deleted from pixels belonging to the content of the beach in the image in RAW format, and pixels with pixel values in a range of 128 to 383 are retained. In this manner, pixel values of pixels reserved for the two parts of content have 256 levels, and thus the pixels may be represented by 8 bits. Consequently, the image in RGB format with the bitwidth of 8 bits may be generated. It should be noted that, the implementation of discarding pixels corresponding to specific pixel values for different parts of content listed here are merely exemplary and should not constitute a limitation on the disclosure.

In a possible implementation of embodiments of the disclosure, the semantic analysis result of the image in RAW format may be provided to professional users, such as photographers, to receive the feedback of the photographer on discarding and retaining on information in the image in RAW format, and then the image in RAW format is converted into the image in RGB format.

In another possible implementation of embodiments of the disclosure, the image in RGB format corresponding to the image in RAW format may be determined based on the semantic analysis result of the image in RAW format by means of deep learning. For example, the network model is trained in advance, and then the image in RAW format is converted into the image in RGB format through the network model, that is, the image in RGB format corresponding to the image in RAW format is determined.

In embodiments of the disclosure, the semantic analysis result of the image in RAW format is obtained through the pre-trained first network model, and the image in RGB format corresponding to the image in RAW format is determined based on the semantic analysis result of the image in RAW format. The first network model is obtained by training based on the labeled training sample corresponding to each of the plurality of first training samples. The first training sample is the image in RAW format. The labeled training sample is the image in RAW format obtained by labeling the semantic analysis result on the corresponding first training sample. In this manner, when the image in RAW format in RAW format is converted into the image in RGB format, the semantic understanding of the image in RAW format may be taken into account, that is, the content presented by the image in RAW format may be taken into account, such that the image quality of the image in RGB format converted from the image in RAW format may be improved.

Figure 2:
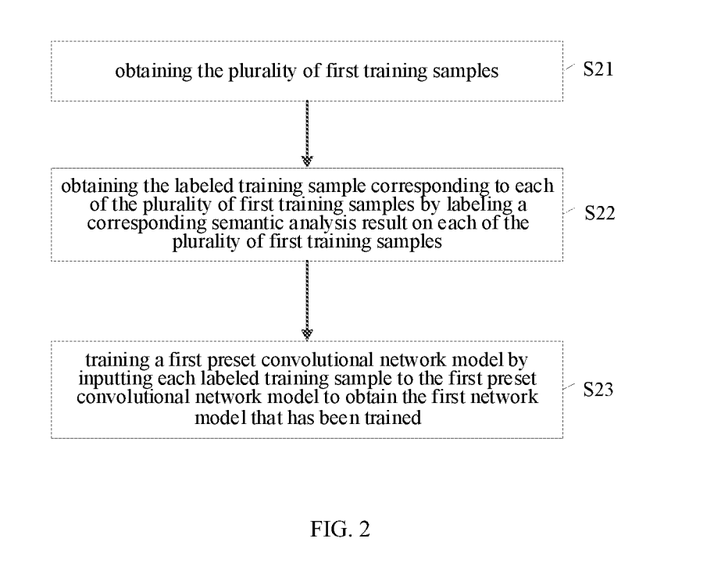
FIG. 2 is a flowchart illustrating training a first network model according to some embodiments.

Actions of training the first network model are included in some embodiments of the disclosure. As illustrated in FIG. 2, the actions include the following.

At block S21, the plurality of first training samples are obtained.

The first training sample is an image in RAW format. In order to improve the accuracy of the trained network model, the plurality of first training samples may be obtained. For example, 5,000, 1,000 and other quantities of first training samples may be obtained.

Obtaining the plurality of first training samples may also be understood as establishing a training set. In detail, a plurality of images in RAW format may be collected by a camera and determined as the first training samples. It should be noted that the specific implementation of establishing the training set shown here is merely an example and should not constitute a limitation to embodiments of the disclosure. Any method of establishing the training set of images in RAW format is applicable to embodiments of the disclosure.

At block S22, the labeled training sample corresponding to each of the plurality of first training samples is obtained by labeling a corresponding semantic analysis result on each of the plurality of first training samples.

It may be understood that the labeled training samples are the first training samples labeled with the semantic analysis results. In practical applications, when images in RAW format determined as the first training samples are obtained, the semantic analysis results of the images in RAW format may be labeled. The semantic analysis results of the images in RAW format may be used as labeling information of the first training samples, so that the first training samples and the labeling information of the first training samples may be used as the labeled training samples corresponding to the first training samples.

In an implementation, the semantic analysis result of each first training sample may be labeled by manual labeling so as to obtain the labeled training sample corresponding to each first training sample.

In an implementation, the semantic analysis result of each first training sample may be labeled through ISP so as to obtain the labeled training sample corresponding to each first training sample. In detail, an action of setting a geometric correspondence of pixel levels in images is added to the ISP method for implementing image format conversion in the related art, that is, an action of setting a correspondence between pixels in the image in RAW format and pixels in the image in RGB format is added. In this manner, by performing the ISP method on the image in RAW format, the image in RGB format after conversion and the correspondence between pixels in the two images before and after the conversion may be obtained. And then, an existing image segmentation algorithm is applied to the converted image in RGB format to segment different content, and pixels in the segmented content are labeled with attributes, thereby generating a semantic segmentation result of the image in RGB format. On the basis of the correspondence between the pixels in the image in RAW format and the image in RGB format, a semantic analysis result of the image in RGB format is mapped to the image in RAW format, such that a semantic analysis result of the image in RAW format is obtained and determined as the labeled training sample of the first training sample. The semantic analysis result of the image in RGB format may be generated in a manual manner, or by an automated execution program written with reference to the manual manner.

The ISP method in the related art is usually implemented by several modules, such as a module for auto white balance (AWB), a module for auto exposure (AE), a module for denoising, a module for sharpening. Each module has its own setting parameters. When the setting parameters change, reference pixel values of pixels to be discarded may change accordingly.

At block S23, a first preset convolutional network model is trained by inputting each labeled training sample to the first preset convolutional network model to obtain the first network model that has been trained.

The first preset convolutional network model includes, but is not limited to, a preprocessing layer, an encoding layer, a decoding layer, and a connection layer.

The first preset convolutional neural network model may adopt various types of models. For example, a fully convolutional network, such as a U-Net/Hourglass structure convolutional network, may be adopted. An input of the first preset convolutional neural network model is a labeled image in RAW format, and an output is semantic information, i.e., the semantic analysis result, of each pixel in the image in RAW format after the processing of the preprocessing layer, the encoding layer: encoder layer, the decoding layer: decoder layer, and the connection layer: skip connection layer.

It may be understood that, after the labeled training samples are inputted to the first preset convolutional network model in block S23, the first preset convolutional network model may output semantic analysis results of images in RAW format corresponding to the labeled training samples. A loss value of the first preset convolutional network model may be calculated based on a difference between the semantic analysis results of the images in RAW format outputted and the semantic analysis results labeled in the labeled training samples. When the loss value is less than the preset first threshold, the training of the first preset convolutional network model is ended, and the first network model is obtained. In this manner, when the image in RAW format is inputted to the first network model, the first network model may directly output the semantic analysis result of the image in RAW format.

In a possible implementation, in block S13, determining the image in RGB format corresponding to the image in RAW format based on the semantic analysis result of the image in RAW format includes obtaining the image in RGB format corresponding to the image in RAW format by inputting the image in RAW format and the semantic analysis result of the image in RAW format into a pre-trained second network model.

The second network model is obtained by training based on a plurality of second training samples, a semantic analysis result of each of the plurality of second training samples, and a converted sample corresponding to each of the plurality of second training samples. The second training sample is a sample image in RAW format. The converted sample corresponding to each of the plurality of second training samples is a sample image in RGB format obtained by performing format conversion on the corresponding second training sample. In this manner, the trained second network model may learn a way of converting an image in RAW format to an image in RGB format.

Figure 3:
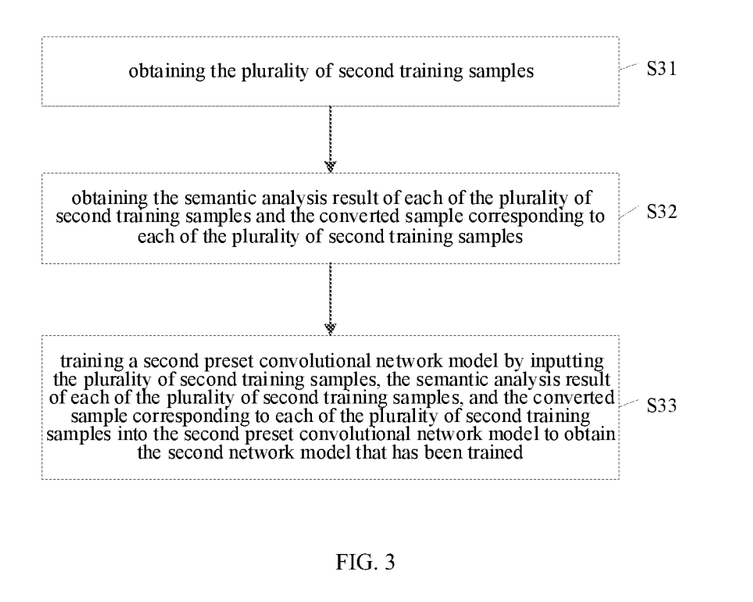
FIG. 3 is a flowchart illustrating training a second network model according to some embodiments.

For the clarity of the solutions, embodiments of the disclosure also provide actions of training the second network model. As illustrated in FIG. 3, the actions may include the following.

At block S31, the plurality of second training samples are obtained.

In order to improve the accuracy of training the second network model, the plurality of second training samples may be obtained. For example, 5,000, 1,000 or other quantities of second training samples may be obtained.

At block S32, the semantic analysis result of each of the plurality of second training samples and the converted sample corresponding to each of the plurality of second training samples are obtained.

It may be understood that obtaining the plurality of second training samples and the converted samples corresponding the plurality of second training samples may be understood as establishing a training set. In detail, the training set may be established in the following two ways.

In a possible implementation, a supervision method may be adopted. A professional such as a photographer may convert an image in RAW format to an image in RGB format. With reference to actions in block S22 of labeling the semantic analysis results on the plurality of first training samples, the semantic analysis results of the images in RAW format before conversion are obtained. And then, the images in RAW format before conversion are used as the second training samples, the semantic analysis results of the images in RAW format before conversion are used as the semantic analysis results of the second training samples, and the images in RGB format obtained after conversion are used as the converted samples corresponding to the second training samples. In this manner, entire images in RGB format obtained after conversion may be used as supervision information of the images in RAW format before conversion.

In another possible implementation, a semi-supervised method may be adopted. An existing image in RGB format with high evaluation may be collected. An image in RAW format may be converted into an image in RGB format, that is, target image, through the ISP method in the related art. The target image may be compared with the collected image in RGB format to determine an area with similar content in the target image and the collected image in RGB format. With reference to actions S22 of labeling the semantic analysis results on the first training samples, the semantic analysis results of the images in RAW format are obtained. The images in RAW format are used as the second training samples, and the semantic analysis results of the images in RAW format are used as the semantic analysis results of the second training samples. The collected images in RGB format are used as the converted samples corresponding to the second training samples. In this manner, in the collected images in RGB format, image data belonging to the area may be used as supervision information of image data of the same area in the images in RAW format before conversion.

At block S33, a second preset convolutional network model is trained by inputting the plurality of second training samples, the semantic analysis result of each of the plurality of second training samples, and the converted sample corresponding to each of the plurality of second training samples into the second preset convolutional network model to obtain the second network model that has been trained.

It may be understood that, in block S33, after the second training samples and the semantic analysis results of the second training samples are inputted into the second preset convolutional network model, the second preset convolutional network model may input the converted samples corresponding to the second training samples. A loss value of the second preset convolutional network model may be calculated based on a difference between the outputted converted samples corresponding to the second training samples and the converted samples corresponding to the second training samples obtained in advance. When the loss value is less than the preset second threshold, the training of the second preset convolutional network model is ended, and the second network model is obtained. In this manner, the image in RAW format and the semantic analysis result of the image in RAW format are inputted to the second network model, and the second network model may directly output the image in RGB format corresponding to the image in RAW format. In addition, the ability of the second network model in choosing among image information of the image in RAW format is learned from the training set. Therefore, the image quality of the image in RGB format obtained after conversion is equivalent to the image quality of the image in RGB format, which is converted by professionals and the image in RGB format with high evaluation.

In a possible implementation of embodiments of the disclosure, in the process of training the second preset convolutional network model, after the second preset convolutional network model outputs the image in RGB format, the output result may be sent to the user. The user may give out a score based on the output result. The score is fed back to the second preset convolutional network model, so that the performance of the network model may be improved by gradually training.

In addition, in an optional implementation of embodiments of the disclosure, after obtaining the semantic analysis result of the image in RAW format by inputting the image in RAW format into the pre-trained first network model in block S12, the method further includes adjusting a viewfinder image when a user is photographing based on the semantic analysis result of the image in RAW format.

It may be understood that, in some embodiments, the image in RAW format may be the viewfinder image displayed when the user is photographing.

Ordinary users do not have professional photography knowledge. With embodiments of the disclosure, after semantic analysis is performed on the image in RAW format, semantic understanding may be obtained based on the current content captured without generating the image in RGB format in the view finding stage before photographing. On the basis of the semantic analysis result understood, the viewfinder image may be adjusted in terms of the composition, lighting, content and other aspects, so as to provide the user with photographing suggestions, assist ordinary users in professional photographing, improve the quality of images photographed by the user, and generate higher image quality and better artistic conception automatically. In addition, the user experience may be improved.

For example, in a specific application scenario, such as when photographing a portrait image on a beach in the sunset, on the basis of the determined semantic analysis result, scene information to be photographed may be determined, namely the sunset and the beach, and the subject to be photographed may be determined, namely people. Therefore, on the basis of information determined, the image may be segmented according to the semantic. Further, warm tones are selected for the light and color temperature, and parts of the image that are not affected by the sunset, such as the distant blue sky and the sea, are excluded. At the same time, the portrait may be processed separately from the background. Therefore, in the embodiments, the segmentation and understanding of different semantic content of the image are involved and different color brightness adjustments are performed on different semantic content separately. It may be seen that the solution according to embodiments of the disclosure may replace decisions of photographers and make a choice among information in the image in RAW format.

In addition, for different users, the adjusted view parameters may be saved as preference settings of the users so that the saved view parameters may be automatically adapted to the next photographing.

Figure 4:
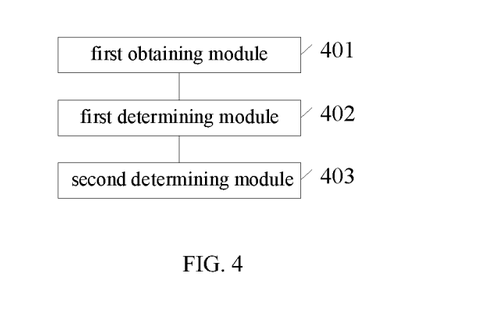
FIG. 4 is a block diagram illustrating an apparatus for converting an image according to some embodiments.

FIG. 4 is a block diagram illustrating an apparatus for converting an image according to some embodiments. As illustrated in FIG. 4, the apparatus may include a first obtaining module 401, a first determining module 402, and a second determining module 403.

The first obtaining module 401 is configured to obtain an image in RAW format.

The first determining module 402 is configured to obtain a semantic analysis result of the image in RAW format by inputting the image in RAW format into a pre-trained first network model. The first network model is obtained by training based on a labeled training sample corresponding to each of a plurality of first training samples. The first training sample is a sample image in RAW format, and the labeled training sample is a sample image in RAW format obtained by labeling a semantic analysis result on the corresponding first training sample.

The second determining module 403 is configured to determine an image in RGB format corresponding to the image in RAW format based on the semantic analysis result of the image in RAW format.

Optionally, the second determining module 403 is configured to obtain the image in RGB format corresponding to the image in RAW format by inputting the image in RAW format and the semantic analysis result of the image in RAW format into a pre-trained second network model. The second network model is obtained by training based on a plurality of second training samples, a semantic analysis result of each of the plurality of second training samples, and a converted sample corresponding to each of the plurality of second training samples. The second training sample is a sample image in RAW format, and the converted sample corresponding to each of the plurality of second training samples is a sample image in RGB format obtained by performing format conversion on the corresponding second training sample.

Optionally, the apparatus further includes an auxiliary photographing module. The auxiliary photographing module is configured to adjust a viewfinder image when a user is photographing based on the semantic analysis result of the image in RAW format.

Optionally, the apparatus further includes a second obtaining module, a labeling module, and a first training module. The second obtaining module is configured to obtain the plurality of first training samples. The labeling module is configured to obtain the labeled training sample corresponding to each of the plurality of first training samples by labeling a corresponding semantic analysis result on each of the plurality of first training samples. The first training module is configured to train a first preset convolutional network model by inputting each labeled training sample to the first preset convolutional network model to obtain the first network model that has been trained.

Optionally, the first preset convolutional network model includes a preprocessing layer, an encoding layer, a decoding layer, and a connection layer.

Optionally, the apparatus further includes a third obtaining module, a fourth obtaining module, and a second training module. The third obtaining module is configured to obtain the plurality of second training samples. The fourth obtaining module is configured to obtain the semantic analysis result of each of the plurality of second training samples and the converted sample corresponding to each of the plurality of second training samples. The second training module is configured to train a second preset convolutional network model by inputting the plurality of second training samples, the semantic analysis result of each of the plurality of second training samples, and the converted sample corresponding to each of the plurality of second training samples into the second preset convolutional network model to obtain the second network model that has been trained.

With the apparatus for converting the image according to embodiments of the disclosure, the semantic analysis result of the image in RAW format is obtained through the pre-trained first network model, and the image in RGB format corresponding to the image in RAW format is determined based on the semantic analysis result of the image in RAW format. The first network model is obtained by training based on the labeled training sample corresponding to each of the plurality of first training samples. The first training sample is the image in RAW format. The labeled training sample is the first training sample labeled with the semantic analysis result. In this manner, when the image in RAW format in RAW format is converted into the image in RGB format, the semantic understanding of the image in RAW format may be taken into account, that is, the content presented by the image in RAW format may be taken into account, such that the image quality of the image in RGB format converted from the image in RAW format may be improved.

Regarding the apparatus according to the foregoing embodiments, the specific manner in which each module performs operations has been described in detail in embodiments of the method, and thus detailed description will not be repeated here.

Figure 5:
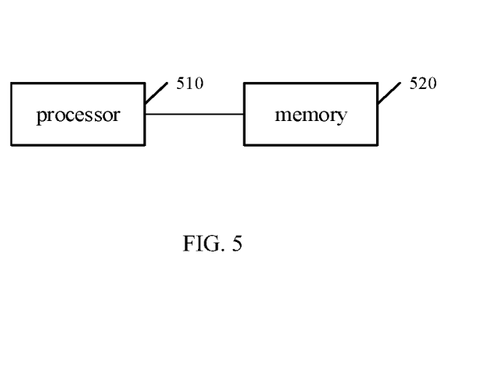
FIG. 5 is a block diagram illustrating an electronic device according to some embodiments.

FIG. 5 is a block diagram illustrating an electronic device according to some embodiments. As illustrated in FIG. 5, the electronic device may include a processor 510, and a memory 520 configured to store an instruction executable by the processor 510. The processor 510 is configured to implement the method for converting the image as described above.

According to another aspect of embodiments of the disclosure, a non-transitory computer-readable storage medium having one or more computer instruction programs stored thereon is provided. When the one or more computer instruction programs are executed by one or more processors, the one or more processors implement the method for converting the image as described above.

According to yet another aspect of embodiments of the disclosure, a computer program product is provided. When the computer program product is executed by a processor of an electronic device, the electronic device may implement the method for converting the mage as described above.

Figure 6:
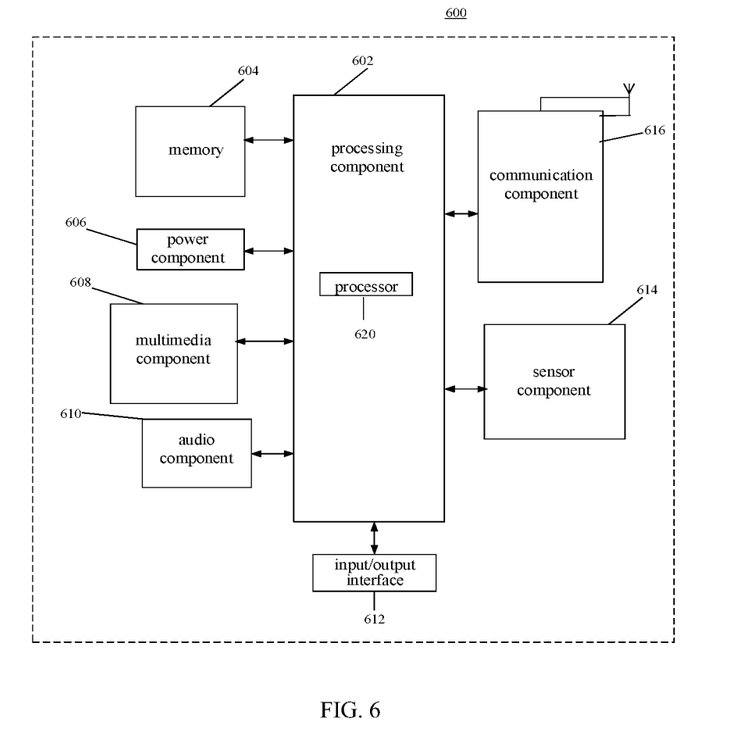
FIG. 6 is a block diagram illustrating a device for converting an image according to some embodiments.

FIG. 6 is a block diagram illustrating a device 600 for converting an image according to some embodiments. For example, the device 600 may be a mobile phone, a computer, a digital broadcast terminal, a messaging device, a game console, a tablet device, a medical device, an exercise device, a personal digital assistant, and so on.

Referring to FIG. 6, the device 600 may include one or more of the following components: a processing component 602, a memory 604, a power component 606, a multimedia component 608, an audio component 810, an input/output (I/O) interface 612, a sensor component 614, and a communication component 616.

The processing component 602 normally controls the overall operation (such as operations associated with displaying, telephone calls, data communications, camera operations and recording operations) of the device 600. The processing component 602 may include one or more processors 620 to execute instructions so as to perform all or part of the actions of the above described method. In addition, the processing component 602 may include one or more units to facilitate interactions between the processing component 602 and other components. For example, the processing component 602 may include a multimedia unit to facilitate interactions between the multimedia component 608 and the processing component 602.

The memory 604 is configured to store various types of data to support operations at the device 600. Examples of such data include instructions for any application or method operated on the device 600, contact data, phone book data, messages, images, videos and the like. The memory 604 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 606 provides power to various components of the device 600. The power component 606 may include a power management system, one or more power sources and other components associated with power generation, management, and distribution of the device 600.

The multimedia component 608 includes a screen that provides an output interface between the device 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may sense not only the boundary of the touches or sliding actions, but also the duration and pressure related to the touches or sliding operations. In some embodiments, the multimedia component 608 includes a front camera and/or a rear camera. When the device 600 is in an operation mode such as a shooting mode or a video mode, the front camera and/or the rear camera may receive external multimedia data. Each front camera and rear camera may be a fixed optical lens system or have a focal length and an optical zoom capability.

The audio component 810 is configured to output and/or input an audio signal. For example, the audio component 810 includes a microphone (MIC) that is configured to receive an external audio signal when the device 600 is in an operation mode such as a call mode, a recording mode, and a voice recognition mode. The received audio signal may be further stored in the memory 604 or transmitted via the communication component 616. In some embodiments, the audio component 810 further includes a speaker for outputting audio signals.

The I/O interface 612 provides an interface between the processing component 602 and a peripheral interface unit. The peripheral interface unit may be a keyboard, a click wheel, a button and so on. These buttons may include, but are not limited to, a home button, a volume button, a start button, and a locking button.

The sensor component 614 includes one or more sensors for providing the device 600 with various aspects of status assessments. For example, the sensor component 614 may detect an ON/OFF state of the device 600 and a relative positioning of the components. For example, the components may be a display and a keypad of the device 600. The sensor component 614 may also detect a change in position of the device 600 or a component of the device 600, the presence or absence of contact of the user with the device 600, the orientation or acceleration/deceleration of the device 600 and a temperature change of the device 600. The sensor component 614 may include a proximity sensor configured to detect the presence of nearby objects without any physical contact. The sensor component 614 may also include a light sensor (such as a CMOS or a CCD image sensor) for use in imaging applications. In some embodiments, the sensor component 614 may further include an acceleration sensor, a gyro sensor, a magnetic sensor, a pressure sensor, or a temperature sensor.

The communication component 616 is configured to facilitate wired or wireless communication between the device 600 and other devices. The device 600 may access a wireless network based on a communication standard such as 2G, 3G, 4G, 5G or a combination thereof. In some embodiments, the communication component 616 receives broadcast signals or broadcast-associated information from an external broadcast management system via a broadcast channel. In some embodiments, the communication component 616 further includes a near field communication (NFC) module to facilitate short range communication. For example, the NFC module may be implemented based on radio frequency identification (RFID) technology, infrared data association (IrDA) technology, ultra-wide band (UWB) technology, Bluetooth (BT) technology and other technologies.

In some embodiments, the device 600 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above image conversion method.

In some embodiments, there is also provided a non-transitory computer readable storage medium including instructions, such as a memory 604 including instructions. The instructions are executable by the processor 620 of the device 600 to perform the above method. For example, the non-transitory computer readable storage medium may be a ROM, a random-access memory (RAM), a CD-ROM, a magnetic tape, a floppy disk, an optical data storage device, etc.

Figure 7:
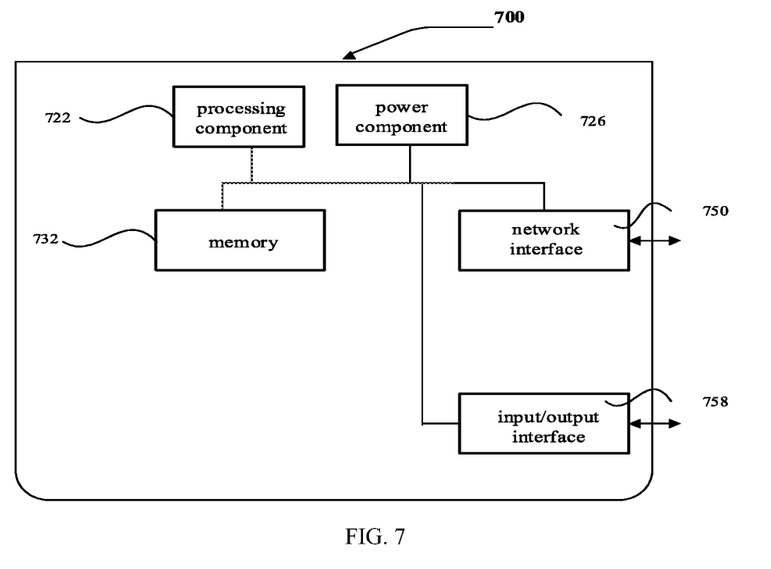
FIG. 7 is a block diagram illustrating a device for converting an image according to some embodiments.

FIG. 7 is a block diagram illustrating a device 700 for converting an image according to some embodiments. For example, the device 700 may be provided as a server. Referring to FIG. 7, the device 700 includes a processing component 722 including one or more processors and a memory resource represented by a memory 732. The memory 732 is configured to store instructions executable by the processing component 722, such as an application program. The application program stored in the memory 732 may include one or more modules each corresponding to a set of instructions. In addition, the processing component 722 is configured to execute instructions so as to implement the method for converting the image.

The device 700 may also include a power component 726 configured to perform power management of the device 700, a wired or wireless network interface 750 configured to connect the device 700 to a network, and an input/output (I/O) interface 758. The device 700 may operate an operating system stored in the memory 732, such as Windows Server™, Mac OS X™, Unix™, Linux™, FreeBSD™ or similar operating systems.

The above descriptions are only embodiments of the disclosure, and are not intended to limit the disclosure. Any modification, equivalent replacement and improvement made within the spirit and principle of the disclosure shall be included in the protection scope of the disclosure.

What is claimed is:

1. A method for converting an image, comprising:
    obtaining an image in RAW format;
    obtaining a semantic analysis result of the image in RAW format by inputting the image in RAW format into a pre-trained first network model; in which the first network model is obtained by training based on a first labeled training sample corresponding to each of a plurality of first training samples, the first training sample is an image in RAW format, and the first labeled training sample is an image obtained by labeling a semantic analysis result on the corresponding first training sample; and
    determining an image in RGB (Red-Green-Blue) format corresponding to the image in RAW format based on the semantic analysis result of the image in RAW format, in which the semantic analysis result comprises attribute information of each pixel point in the image in RAW format and relationship attribute information among pixel points,
    wherein content presented by the image in RAW format is determined based on the attribute information, and for different content, determining the image in RGB format corresponding to the image in RAW format with image signal processing (ISP) parameters applicable to the content.

2. The method of claim 1, wherein determining the image in RGB format corresponding to the image in RAW format based on the semantic analysis result of the image in RAW format comprises:
    obtaining the image in RGB format corresponding to the image in RAW format by inputting the image in RAW format and the semantic analysis result of the image in RAW format into a pre-trained second network model;
    in which the second network model is obtained by training based on a plurality of second training samples and a converted sample corresponding to each of the plurality of second training samples, the second training sample is an image in RAW format, and the converted sample corresponding to each of the plurality of second training samples is an image in RGB format of the corresponding second training sample.

3. The method of claim 1, after obtaining the semantic analysis result of the image in RAW format by inputting the image in RAW format into the pre-trained first network model, further comprising:
    assisting a user to photograph based on the semantic analysis result of the image in RAW format.

4. The method of claim 1, wherein training the first network model comprises:
    obtaining the plurality of first training samples;
    obtaining the first labeled training sample corresponding to each of the plurality of first training samples by labeling a corresponding semantic analysis result on each of the plurality of first training samples; and
    training a first preset convolutional network model by inputting each first labeled training sample to the first preset convolutional network model to obtain the first network model that has been trained.

5. The method of claim 4, wherein the first preset convolutional network model comprises: a preprocessing layer, an encoding layer, a decoding layer, and a connection layer.

6. The method of claim 2, wherein training the second network model comprises:
    obtaining the plurality of second training samples;
    determining the converted sample corresponding to each of the plurality of second training samples, the converted sample corresponding to each of the plurality of second training samples being an image in RGB format; and
    training a second preset convolutional network model by inputting the plurality of second training samples and the converted sample corresponding to each of the plurality of second training samples into the second preset convolutional network model to obtain the second network model that has been trained.

7. An apparatus for converting an image, comprising:
    a first obtaining module, configured to obtain an image in RAW format;
    a first determining module, configured to obtain a semantic analysis result of the image in RAW format by inputting the image in RAW format into a pre-trained first network model; in which the first network model is obtained by training based on a first labeled training sample corresponding to each of a plurality of first training samples, the first training sample is an image in RAW format, and the first labeled training sample is an image obtained by labeling a semantic analysis result on the corresponding first training sample; and
    a second determining module, configured to determine an image in RGB (Red-Green-Blue) format corresponding to the image in RAW format based on the semantic analysis result of the image in RAW format, in which the semantic analysis result comprises attribute information of each pixel point in the image in RAW format and relationship attribute information among pixel points,
    wherein content presented by the image in RAW format is determined based on the attribute information, and for different content, determining the image in RGB format corresponding to the image in RAW format with image signal processing (ISP) parameters applicable to the content.

8. The apparatus of claim 7, wherein the second determining module is configured to:
    obtain the image in RGB format corresponding to the image in RAW format by inputting the image in RAW format and the semantic analysis result of the image in RAW format into a pre-trained second network model;
    in which the second network model is obtained by training based on a plurality of second training samples and a converted sample corresponding to each of the plurality of second training samples, the second training sample is an image in RAW format, and the converted sample corresponding to each of the plurality of second training samples is an image in RGB format of the corresponding second training sample.

9. The apparatus of claim 7, further comprising:
    an auxiliary photographing module, configured to assist a user to photograph based on the semantic analysis result of the image in RAW format.

10. The apparatus of claim 7, further comprising:
    a second obtaining module, configured to obtain the plurality of first training samples;
    a labeling module, configured to obtain the first labeled training sample corresponding to each of the plurality of first training samples by labeling a corresponding semantic analysis result on each of the plurality of first training samples; and a first training module, configured to train a first preset convolutional network model by inputting each first labeled training sample to the first preset convolutional network model to obtain the first network model that has been trained.

11. The apparatus of claim 10, wherein the first preset convolutional network model comprises: a preprocessing layer, an encoding layer, a decoding layer, and a connection layer.

12. The apparatus of claim 7, further comprising:
a third obtaining module, configured to obtain the plurality of second training samples;
a converted sample determining module, configured to determine the converted sample corresponding to each of the plurality of second training samples, the converted sample corresponding to each of the plurality of second training samples being an image in RGB format; and
a second training module, configured to train a second present convolutional network model by inputting the plurality of second training samples and the converted sample corresponding to each of the plurality of second training samples into the second preset convolutional network model to obtain the second network model that has been trained.

13. An electronic device, comprising:
a processor; and
a memory configured to store an instruction executable by the processor;
wherein the processor is configured to:
obtain an image in RAW format;
obtain a semantic analysis result of the image in RAW format by inputting the image in RAW format into a pre-trained first network model; in which the first network model is obtained by training based on a first labeled training sample corresponding to each of a plurality of first training samples, the first training sample is an image in RAW format, and the first labeled training sample is an image obtained by labeling a semantic analysis result on the corresponding first training sample; and
determine an image in RGB (Red-Green-Blue) format corresponding to the image in RAW format based on the semantic analysis result of the image in RAW format, in which the semantic analysis result comprises attribute information of each pixel point in the image in RAW format and relationship attribute information among pixel points,
wherein content presented by the image in RAW format is determined based on the attribute information, and for different content, determining the image in RGB format corresponding to the image in RAW format with image signal processing (ISP) parameters applicable to the content.

14. The electronic device of claim 13, wherein the processor is configured to:
obtain the image in RGB format corresponding to the image in RAW format by inputting the image in RAW format and the semantic analysis result of the image in RAW format into a pre-trained second network model;
in which the second network model is obtained by training based on a plurality of second training samples and a converted sample corresponding to each of the plurality of second training samples, the second training sample is an image in RAW format, and the converted sample corresponding to each of the plurality of second training samples is an image in RGB format of the corresponding second training sample.

15. The electronic device of claim 13, wherein the processor is further configured to:
assist a user to photograph based on the semantic analysis result of the image in RAW format.

16. The electronic device of claim 13, wherein the processor is further configured to:
obtain the plurality of first training samples;
obtain the first labeled training sample corresponding to each of the plurality of first training samples by labeling a corresponding semantic analysis result on each of the plurality of first training samples; and
train a first preset convolutional network model by inputting each first labeled training sample to the first preset convolutional network model to obtain the first network model that has been trained.

17. The electronic device of claim 16, wherein the first preset convolutional network model comprises: a preprocessing layer, an encoding layer, a decoding layer, and a connection layer.

18. The electronic device of claim 14, wherein the processor is further configured to:
obtain the plurality of second training samples;
determine the converted sample corresponding to each of the plurality of second training samples, the converted sample corresponding to each of the plurality of second training samples being an image in RGB format; and
train a second preset convolutional network model by inputting the plurality of second training samples and the converted sample corresponding to each of the plurality of second training samples into the second preset convolutional network model to obtain the second network model that has been trained.

19. A non-transitory computer-readable storage medium, wherein in response to executing instructions in the storage medium by a processor of an electronic device, the electronic device is cause to perform a method for converting an image, the method comprising:
obtaining an image in RAW format;
obtaining a semantic analysis result of the image in RAW format by inputting the image in RAW format into a pre-trained first network model; in which the first network model is obtained by training based on a first labeled training sample corresponding to each of a plurality of first training samples, the first training sample is an image in RAW format, and the first labeled training sample is an image obtained by labeling a semantic analysis result on the corresponding first training sample; and
determining an image in RGB (Red-Green-Blue) format corresponding to the image in RAW format based on the semantic analysis result of the image in RAW format, in which the semantic analysis result comprises attribute information of each pixel point in the image in RAW format and relationship attribute information among pixel points,
wherein content presented by the image in RAW format is determined based on the attribute information, and for different content, determining the image in RGB format corresponding to the image in RAW format with image signal processing (ISP) parameters applicable to the content.

20. The non-transitory computer-readable storage medium of claim 19, wherein determining the image in RGB format corresponding to the image in RAW format based on the semantic analysis result of the image in RAW format comprises:
  obtaining the image in RGB format corresponding to the image in RAW format by inputting the image in RAW format and the semantic analysis result of the image in RAW format into a pre-trained second network model; in which the second network model is obtained by training based on a plurality of second training samples and a converted sample corresponding to each of the plurality of second training samples, the second training sample is an image in RAW format, and the converted sample corresponding to each of the plurality of second training samples is an image in RGB format of the corresponding second training sample.

21. The non-transitory computer-readable storage medium of claim 19, wherein after obtaining the semantic analysis result of the image in RAW format by inputting the image in RAW format into the pre-trained first network model, the method further comprises:
  assisting a user to photograph based on the semantic analysis result of the image in RAW format.

22. The non-transitory computer-readable storage medium of claim 19, wherein training the first network model comprises:
  obtaining the plurality of first training samples;
  obtaining the first labeled training sample corresponding to each of the plurality of first training samples by labeling a corresponding semantic analysis result on each of the plurality of first training samples; and
  training a first preset convolutional network model by inputting each first labeled training sample to the first preset convolutional network model to obtain the first network model that has been trained.

23. The non-transitory computer-readable storage medium of claim 22, wherein the first preset convolutional network model comprises: a preprocessing layer, an encoding layer, a decoding layer, and a connection layer.

24. The non-transitory computer-readable storage medium of claim 20, wherein training the second network model comprises:
  obtaining the plurality of second training samples;
  determining the converted sample corresponding to each of the plurality of second training samples, the converted sample corresponding to each of the plurality of second training samples being an image in RGB format; and
  training a second preset convolutional network model by inputting the plurality of second training samples and the converted sample corresponding to each of the plurality of second training samples into the second preset convolutional network model to obtain the second network model that has been trained.

* * * * *